United States Patent
Heiskanen et al.

(10) Patent No.: US 9,267,050 B2
(45) Date of Patent: Feb. 23, 2016

(54) COMPOSITION COMPRISING MICROFIBRILLATED CELLULOSE AND A PROCESS FOR THE PRODUCTION OF A COMPOSITION

(75) Inventors: Isto Heiskanen, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 191 days.

(21) Appl. No.: 13/696,492

(22) PCT Filed: May 11, 2011

(86) PCT No.: PCT/IB2011/052063
§ 371 (c)(1),
(2), (4) Date: Nov. 6, 2012

(87) PCT Pub. No.: WO2011/141876
PCT Pub. Date: Nov. 17, 2011

(65) Prior Publication Data
US 2013/0047893 A1     Feb. 28, 2013

(30) Foreign Application Priority Data
May 12, 2010 (SE) ..................................... 1050471

(51) Int. Cl.
| | | |
|---|---|---|
| *C09D 101/02* | (2006.01) | |
| *C08L 1/02* | (2006.01) | |
| *D21C 9/00* | (2006.01) | |
| *D21H 11/20* | (2006.01) | |
| D21C 5/00 | (2006.01) | |
| D21H 17/00 | (2006.01) | |
| C08K 3/00 | (2006.01) | |
| C08K 5/00 | (2006.01) | |

(52) U.S. Cl.
CPC ................. *C09D 101/02* (2013.01); *C08L 1/02* (2013.01); *D21C 9/005* (2013.01); *D21H 11/20* (2013.01); *C08K 3/0033* (2013.01); *C08K 5/0041* (2013.01); *C08L 2666/34* (2013.01); *D21C 5/005* (2013.01); *D21H 17/005* (2013.01)

(58) Field of Classification Search
CPC ...... C08L 1/02; C08L 2666/34; C09D 101/02; C08K 3/0033; C08K 5/0041; D21H 11/20
USPC ....................................................... 106/162.8
See application file for complete search history.

(56) References Cited

U.S. PATENT DOCUMENTS

| | | | |
|---|---|---|---|
| 4,481,076 A | 11/1984 | Herrick | |
| 7,744,688 B2 * | 6/2010 | Skuse et al. .................... | 106/464 |
| 7,838,666 B2 * | 11/2010 | Yaginuma ................. | A23F 3/40 |
| | | | 426/658 |
| 8,728,273 B2 * | 5/2014 | Heiskanen et al. ........ | 162/157.6 |
| 2001/0011516 A1 | 8/2001 | Cantiani et al. | |
| 2009/0221812 A1 * | 9/2009 | Ankerfors et al. .............. | 536/56 |

FOREIGN PATENT DOCUMENTS

| | | |
|---|---|---|
| WO | 2004055267 | 7/2004 |
| WO | 2007-091942 | 8/2007 |

OTHER PUBLICATIONS

International Search Report issued in International Application No. PCT/IB2011/052063, dated Sep. 6, 2011.
Institutionen for Pappersteknik KTH, "Pappersteknik," 1992, second edition, ISBN 91-7170076-5, pp. 446-447.

\* cited by examiner

*Primary Examiner* — David M Brunsman
(74) *Attorney, Agent, or Firm* — Greer, Burns & Crain, Ltd.

(57) ABSTRACT

The present invention relates to a composition comprising microfibrillated cellulose, mono-, di- or oligo-saccharides and a pigment in order to achieve a composition with improved rheological properties such as a low viscosity even at high dry content. The present invention further relates to process for the production of said composition.

19 Claims, No Drawings

COMPOSITION COMPRISING MICROFIBRILLATED CELLULOSE AND A PROCESS FOR THE PRODUCTION OF A COMPOSITION

This application is a U.S. National Stage under 35 U.S.C. §371 of International Application No. PCT/IB2011/052063, filed May 11, 2011, which claims priority from Swedish Patent Application No. 1050471-0, filed May 12, 2010.

FIELD OF THE INVENTION

The present invention relates to a composition comprising microfibrillated cellulose and mono-, di- or oligo-saccharides. The invention further relates to a process for the production of such a composition.

BACKGROUND

Microfibrillated cellulose (MFC) (also known as nanocellulose) is a material made from cellulose fibers, where the individual microfibrils have been partly or totally detached from each other. MFC is normally very thin (~20 nm) and the length is often between 100 nm to 10 µm. However, the microfibrils may also be longer, for example between 10-100 µm.

MFC can be produced in a number of different ways. It is possible to mechanically treat cellulosic fibers so that microfibrils are formed. The production of nanocellulose or microfibrillated cellulose with bacteria is another option. It is also possible to produce microfibrils from cellulose by the aid of different chemicals and/or enzymes which will break interfibrillar bonds or dissolve the fibers. One example of production of MFC is shown in WO2007091942 which describes production of MFC by the aid of refining in combination with addition of an enzyme.

MFC can be used within many different fields. In the papermaking industry it can both be added to the surface of a paper or board or to the furnish. It has been shown that addition of MFC can increase the strength of a paper or board. When used in paper coating applications, it replaces the synthetic or natural binders such as starch. Since the MFC has a very shear-characteristic effect at low and high solid content, it can be used to as thickening agent and/or water retention aid. However, it can also be used in many other technical fields, such as the food industry, polymer or plastic industry, paint, composite industry (e.g. cement), rubber industry, cosmetic and pharmaceutical industry.

A dispersion comprising MFC has the appearance of a highly viscous, shear-thinning transparent gel at low dry contents. Normally, a composition comprising MFC with a consistency of about 4% and higher is in the form of a very thick gel. Very fibrillated and fine material with high degree of polymerization might exhibit a gel like character at solid content about or less than 1 wt %. The gel has high viscosity making it very difficult to make it flow at low shear rates. This makes processing through pipes and pumps very difficult and thus also to distribute it to different end uses, for example to a surface of a paper or board substrate.

Moreover, it is often undesirable to add a composition with low dry content during production of paper or board to the surface of a substrate since it takes a lot of energy to remove the added water, for example during drying of the substrate. Another reason to avoid unnecessary addition of water is to save transportation costs, water and environmental impact (carbon footprint).

It is also possible to dry the produced MFC before addition to e.g. a pigment dispersion or wet end but this is a very energy consuming process and might have significant irreversible chemical and physical structural changes on the microfibrillated cellulose.

There is thus a need for a composition comprising MFC which has processable flow behavior and good colloidal stability at both low and high shear rates.

SUMMARY OF THE INVENTION

It is an object of the present invention to provide a composition comprising microfibrillated cellulose with improved rheology and colloidal stability properties.

This object and other advantages are achieved by the composition described herein below. The present invention relates to a composition comprising microfibrillated cellulose and a pigment wherein the composition further comprises a mono-, di- or oligo-saccharide. It has been shown that the addition of a pigment to a dispersion comprising MFC, mono-, di- or oligo-saccharide and water, thus forming a composition, makes it possible produce a composition comprising MFC with good rheology properties.

The composition preferable comprises 0.1-95% by weight by amount of pigment of microfibrillated cellulose. The amount of MFC in the composition depends on the end use of the composition.

The MFC of the composition is preferable produced by partly enzymatic treatment. During the production of MFC with the aid of enzymes, the cellulosic fibers will be decomposed, released or modified forming MFC and at the same time mono-, di- or oligo-saccharide will be formed. The mono-, di- or oligo-saccharide will work as wetting or dispersion agents which will improve the rheology of the composition. It is preferred to use MFC produced by at least party enzymatic treatment since the MFC dispersion also will comprise formed mono-, di- or oligo-saccharide which thus will be present in the composition making it unnecessary to add mono-, di- or oligo-saccharide separately to the composition.

The composition comprises at least one kind of mono-, di- or oligo-saccharide. It is preferred that the composition comprises 0.01-5% by weight by amount of pigment of mono-, di- or oligo-saccharides. The mono-, di- or oligo-saccharide may be added separately to the composition and/or produced during the production of MFC and thus added together with the MFC.

The mono-, di- or oligo-saccharide may be a sugar, preferable glucose, xylose, mannose, mannan, and/or cellodextrin such as cellobiose, cellotriose, cellotetrose, cellopentose, cellohexose and/or cello-oligosachride.

The mono-, di- or oligo-saccharide of the composition may be modified. By producing MFC by two subsequent enzyme treatments or by subsequent or preceding chemical treatments it is possible to modify the mono-, di- or oligo-saccharide which are formed during production of MFC. The modified mono-, di- or oligo-saccharide and/or released cellulose fragment may then have pre-determined activity or pigment reactivity.

The composition comprises at least one pigment. The amount of pigment in the composition depends on the consistency of the composition. It is preferred to that the pigment is ground or precipitated calcium carbonate, calcinated clay, talcum, kaolin, bentonite or other swelling clays, Al2O3, aluminium hydroxide (ATH), plastic pigments, silica, gypsum, titanium dioxide, organic pigments, such as starch pigments or calcium stearate dispersions and/or a mixture of any of these pigments.

The MFC of the composition may be modified. It is preferred that the MFC is modified with carboxymethyl cellulose (CMC). CMC will work as a lubricant or dispersant and also as a defibrillating agent during the production of MFC. CMC modified nanofibrils and any excess of CMC in the liquid phase will improve the rheology of the composition through specific interaction with the pigments which will lead to improved colloidal stability.

The MFC composition may also comprise dispersants or lubricants. It is preferred to add polyacrylic acids, acrylate copolymers, sodium salts of acrylic acids, polyacrylic acids, maleic acid, polymaleic acids, sodium citrate, sodium malonate, sodium succinate, sodium malate, sodium glutamate, polyphosphates, calcium stearate, PEG and/or triglycerides, sodium hexametaphosphate (SHMP), polyvinyl alcohol, polyvinyl aceate, PVOH/Ac, sodium n-silicate, sodium polyaluminate, sodium tetraborate, bipolar organic dispersants like ethylene glucole, methanol, methyl amine, propyl amine, aniline, or polypolar dispersants like polyethylene oxides and polyethylene derivatives.

The composition may also comprise sorbitol. Addition of sorbitol has shown to facilitate the flow of slurries making it possible to pump and handle the composition in an improved way.

The composition preferable has a dry content of 10-70% by total weight, preferable between 40-70% by weight. It is possible to increase the dry content of the composition comprising MFC since the present mono-, di- or oligo-saccharide will improve the rheology of the composition, making it easier to handle.

The invention further relates to a process for the production of a composition as described above. The composition is produced by adding a pigment to a dispersion comprising MFC, mono-, di- or oligo-saccharides and water. It has been shown that it is possible to increase the dry content of the dispersion comprising MFC and still be able to produce a composition with good rheology properties, such as low viscosity. It is preferred to add a dry pigment to the dispersion comprising MFC. In this way it is possible to increase the dry content of the composition even further since no water is added together with the pigments. However, it is also possible to add wet pigment to the MFC dispersion.

The consistency of the dispersion comprising MFC is preferable between 1-40% by weight before addition of the pigment.

The MFC of the dispersion is preferable produced by at least partly enzymatic treatment of cellulosic fibers. During enzymatic decomposition of cellulosic fibers in order to form MFC, mono-, di- or oligo-saccharides and cellulose fragments are formed. The presence of mono-, di- or oligo-saccharide and cellulose fragments obtained during MFC production in the composition will give the composition improved rheology colloidal properties and desirable and adjustable pigment characteristics.

DETAILED DESCRIPTION

It has been found that addition of a pigment to a dispersion comprising MFC and mono-, di- or oligo-saccharides makes it possible to increase the dry content of the formed composition without increasing the viscosity. In this way it is still possible to handle the composition at high dry contents, even though it comprises MFC which has a very shear thinning property.

It is preferred that the said dispersion contains active substances that promote the colloidal stability and enable liquid-pigment interactions and desirable flow profile at different shear rates.

The composition comprises at least one mono-, di- or oligo-saccharide. The composition may comprise a mixture of different mono-, di-, and/or oligosaccharides.

The composition preferable comprises 0.1-95% by weight by amount of pigment of microfibrillated cellulose, preferable between 0.1-35% by weight by amount of pigment. The amount of MFC in the composition depends on the end use. If the end use of the composition is to replace a synthetic or natural binder, the amounts are typically about 10% by weight based on the amount of pigment of the composition. This is typically binder levels required for graphical paper or LWC papers intended for e.g. offset printing.

The MFC of the composition is preferable produced by partly enzymatic treatment of cellulosic fibers. The production of MFC may be done by combined enzymatic and mechanical or chemical treatments. During the production of MFC with enzymes, such as cellulase, hemicellulase, endoglucanase or mannase, the cellulosic fibers might be partly decomposed or released from the fiber matrix forming MFC and at the same time mono-, di- or oligo-saccharide will be formed. Thus, mono-, di- or oligo-saccharide is added to the composition with the produced MFC. It is has been found that the presence of mono-, di- or oligo-saccharide in the compositions strongly improves the rheology of the composition. The mono-, di- or oligo-saccharides will work as dispersion or stabilizing agent for both MFC and the pigments. Such a stabilizing mechanism is required to ensure good colloidal stability and processability. Certain pigments might partly dissolve or release co- and/or counter ions and it is thus important that the MFC dispersion contains mono-, di- or oligo-saccharides which are able to stabilize the MFC but also the pigment particles. The mono-, di- or oligo-saccharide may also work as a stabilizing agent for emulsions, one good example of such a stabilizing agent is mannose or mannans. Furthermore, by selecting the raw material for the MFC production, it is possible to create different MFC, released cellulose components and mono-, di- or oligo-saccharides with different affinities for the pigments surfaces. For instance, taking a MFC produced from mechanical pulp will most likely contain higher amounts of pectins which in turn has been claimed to have different surface-chemical characteristics and different compatibility in rubbers.

However, mono-, di- or oligo-saccharides may also be added separately to the dispersion comprising MFC and water. It is preferred to add dissolved mono-, di- or oligo-saccharide. However mono-, di- or oligo-saccharide in solid state may also be added. For some end uses it might be necessary to add additional amounts of mono-, di- or oligo-saccharides, i.e. the amounts produced during production of MFC is not enough, in order to achieve the desired properties of the composition.

The composition may also comprise cellulose fragments or cellulose derivatives which are produced during production of MFC. Cellulose derivate is usually a part of a cellulose fiber that is chemically modified.

The mono-, di- or oligo-saccharides may also act as a wetting agent for the pigments. This is due to their characteristic dimension and ability to act as dipolar chemicals. Thus, through both improved dispersion stability and better liquid-particle interaction in both aqueous and non-aqueous media, the properties of the composition is improved making it possible to increase the flowability and dry content of the composition. The mono-, di- or oligo-saccharides are preferable dissolved in the dispersion comprising MFC and water to which the pigment is added. It is thus possible to produce a composition comprising MFC and a pigment with a high dry content. Depending on which enzyme or enzymes used and on the amounts of enzymes, different types and amounts of mono-, di- or oligo-saccharide or cellulose fragments are produced, i.e. both physically and chemically. It is thus possible to alter the enzymatic treatment during the production of MFC in order to produce a MFC dispersion comprising the right amount and type of mono-, di- or oligo-saccharides in order to receive good pigment wetting, lubricating, colloidal stability, and rheology properties of the composition.

The amount of mono-, di- or oligo-saccharide present in the composition is preferable about 0.01-20% by weight by amount of pigment, preferable between 0.1-10% by weight by amount of pigment and even more preferable 0.1-1% by weight by amount of pigment. If targeting the use of a dual system, i.e. post or pre-added dispersant and use of mono-, di- or oligo-saccharides from the production of MFC, the amounts might be less and hence the role of mono-, di- or oligo-saccharides can be preferably a wetting agent or lubricating agent. However, higher and lower amounts can also be used depending both on the end use and on the type of mono-, di- or oligo-saccharides present.

The mono-, di- or oligo-saccharide may be a sugar. Examples of sugars produced during enzymatic decomposition of cellulosic fibers are: glucose, xylose, mannose, mannans and/or cellodextrin such as cellobiose, cellotriose, cellotetrose, cellopentose, cellohexose and/or cello-oligosachride, The dispersion comprising MFC of the composition may comprise modified mono-, di- or oligo-saccharides. By producing MFC by two or more subsequent enzyme treatments it is possible to modify the mono-, di- or oligo-saccharides which are formed during production of MFC. The first enzyme is preferable an enzyme which will decompose the cellulosic fibers, such as cellulase, thus forming MFC and dissolved mono-, di- or oligo-saccharides. The second enzyme will decompose and thus modify the formed mono-, di- or oligo-saccharides, for example by oxidizing it. Alternatively, the second enzyme will attack another region on the cellulose fiber and hence produce a different type of mono-, di- or oligo-saccharides or cellulose fragment. In this manner, a dual dispersant/wetting agent component system is obtained.

The MFC of the composition may be modified. It is well known how to modify MFC by different additives which will bond to the fibrils and thus change the properties of the MFC. It is possible to change the charge of the fibrils or hydrophilicity/hydrophobicity or oleaphilicity/olephobicity. It is, for example, preferred to modify the MFC of the composition with CMC. CMC may work as a dispersion agent or lubricant during MFC production but will thus also decrease the viscosity and improve the rheology properties of the composition.

The composition comprises at least one pigment. It is preferred that the pigment is ground or precipitated calcium carbonate, calcinated clay, talcum, kaolin, bentonite or other swelling clays, Al2O3, aluminium hydroxide (ATH), plastic pigments, silica, gypsum, titanium dioxide, organic pigments, such as starch pigments or calcium stearate dispersions and/or a mixture of any of these pigments. The pigments may give a fiber based substrate good printing properties, good visual appearance and/or other functionalities like optical, sensing or barrier properties. The pigments may furthermore give other products, such as paint, improved properties.

The composition may also comprise dispersion agents or lubricants in order to further improve the rheology of the composition. It is preferred to add polyacrylic acids, acrylate copolymers, sodium salts of acrylic acids, polyacrylic acids, maleic acid, polymaleic acids, sodium citrate, sodium malonate, sodium succinate, sodium malate, sodium glutamate, polyphosphates, calcium stearate, PEG and/or triglycerides, sodium hexametaphosphate (SHMP), polyvinyl alcohol, polyvinyl aceate, PVOH/Ac, sodium n-silicate, sodium polyaluminate, sodium tetraborate, bipolar organic dispersants like ethylene glucole, methanol, methyl amine, propyl amine, aniline, or polypolar dispersants like polyethylene oxides and polyethylene derivatives. These agents will decrease the viscosity of the composition making it easier to handle the composition in the paper or board machine. The amount of dispersant used, when making a pigment slurry, is preferable in the range of 0.01-2% by weight, calculated on the dry pigment amount. The amount of wetting agent is preferable lower than the required amount of dispersant. Depending on the purpose and the end use of the composition, different amounts and type of dispersants and wetting agents might be used.

The composition may be used as a surface size recipe or coating color which is added to the surface of a fiber based substrate. The composition comprises both MFC, which will increase the strength of the coating, and pigments which will improve the surface properties of the substrate. The composition can also be used in dispersion barriers coatings. It is also possible to add the composition to a fiber based furnish, for example to a furnish during the wet end of a paper or paperboard machine. In this way the composition will be used as filler and will both increase the strength of the fiber based product as well as it will improve the surface properties of the substrate. Other possible end uses may be as a component in paint, cement, food, ink, cosmetics, plastic, resin or wood laminate, composites, pharmaceuticals, asphalt, rubber, ceramics, concrete or other possible end uses where a composition with the improved rheology properties at the same time as the dry content can be increased.

It is possible that said dissolved saccharides in the dispersion comprising MFC can be used as lubricants in order to facilitate the runnability of the process in which the composition is used. The saccharides might also act as dispersants for optical brightening agents. Calcium stearate, poly ethylene glucole or organic triglycerides are often used to provide wet lubrications in e.g. blade coating. Since the sugars of the composition are expected to have bipolar functionality, such lubrication effect can be tailored depending on the MFC raw material and the type of process conditions used. Typical lubricant concentration in e.g. coating colors are 0.2-2% by weight by amount of pigment and more preferably. 0.4-1.2% by weight by amount of pigment. The amounts are often limited by the cost of lubricant and dispersant/wetting agents but in this approach, a better cost-performance ratio is obtained due to the more beneficial price of the raw material, and it is therefore possible to re-engineer the coating formulations more unlimited.

Another advantage with the present invention is that pigments may be modified by adsorbing the dissolved mono-, di- or oligo-saccharides or cellulose fragments. This may result in better compatibility with e.g. biopolymers or certain synthetic polymers of for example a coating. If used in coating preparation methods, it allows higher solid content of the coating composition and better consolidation and interdiffusion. Furthermore, a modified pigment shows better compatibility with e.g. biopolymers such as starch films, PLA films or PLC films which improves for example the strength and barrier properties.

The composition may also comprise sorbitol. Addition of sorbitol has shown to facilitate the flow of slurries making it possible to pump and handle the composition in an improved way. This is advantageous particularly for high concentration kaolin slurries, i.e. solid content >65% by weight.

The composition may also contain traditional binders such as latex, or starch, as well as other coating color ingredients as optical brighteners, cross-linkers, rheology modifiers, pigment extenders, lubricants, dispersants, de-foaming agents, etc Another big advantage with the composition according to the invention is that the presence of mono-, di- or oligo-saccharides results in that the amount of other additives, such as dispersants or wetting agents can be reduced or even eliminated. The mono-, di- or oligo-saccharides are a biochemical which is non-toxic and reusable making the end product more environmental friendly. Many of other additives can be toxic and making it difficult to recycle the end product.

Furthermore, it is more economical and environmental friendly to transport the composition compared to conventional compositions comprising MFC since the dry content may be much higher, hence less amounts of water need to be transported. It is therefore more attractive, to produce the composition off-site. It is thus possible to transport the composition in a more economical and environmental way since less amounts of water need to the transported.

The fiber based substrate is preferable a cellulosic fiber based substrate such as a paper or board.

Fibers that has been fibrillated and which have microfibrils on the surface and microfibrils that are separated and located in a water phase of a dispersion or composition are also included in the definition MFC. The term microfibrillated cellulose (MFC) does include, as stated above nanocellulose, and also cellulose nanocrystallities, cellulose whiskers, fines of fibers and/or blends thereof.

The MFC can be produced from any type of cellulosic fibers, preferable wood fibers, such as softwood or hardwood fibers. However, other raw materials may also be used, such as bamboo, agricultural products, intermediate products from cellulose derivate production, elephant grass and other materials comprising cellulose fibers.

EXAMPLES

Example 1

The amount of sugars produced during enzymatic treatment of cellulosic fibers was investigated.

An amount of 5 g of never dried kraft pulp were subjected to enzymes during 3 hours at a temperature of 50° C. and the amount of dissolved sugars during the treatment was thereafter measured.

The dissolved sugars were measured with liquid chromatography.

TABLE 1

Amount of dissolved sugars using different enzymes

| Enzyme | Dosage (mg/g) | pH | Amount of dissolved sugars (mg/g pulp) |
| --- | --- | --- | --- |
| Biotouch C29 | 0.50 | 5 | 41 |
| Ecostone N400 | 0.50 | 7 | 4 |
| Primafast 200 | 0.2 | 5 | 20 |

As can be seen from Table 1, the amount of dissolved sugars varies depending on the type and dosage of enzymes used. The properties of the treatment, such as pH also affects the amount of dissolved sugars formed.

Examples of receipts of different compositions according to the invention are mentioned below.

Example 2

The composition is to be used as a coating color. The composition may preferable comprise:
100 parts of pigment
5-20 parts of MFC
0-5 pph (part per hundred) additives such as rheology modifiers, lubricants, etc.
5-20 pph of binder
0.1-1 pph of mono-, di-, or oligo-saccharide
Consequently, the amount of mono-, di-, or oligo-saccharide in MFC will be about 1-10%.
Typical solid contents for a coating color used in film press, blade or curtain coating are between 40-70% by weight.

Example 3

The composition is to be used as a surface size composition (pigmentation) preferable comprises.
100 parts of pigments
100 parts of MFC
0-10 parts of additives
The content of mono-, di-, or oligo-saccharide in MFC is preferable between 0.1-10%.
Typical solid content for a sizing composition is 10-60%, more preferable 10-30%.

Example 4

The composition is to be used as a barrier preferable comprises:
100 parts of pigments
50-5000 parts of MFC which works as a barrier agent
The content of mono-, di-, or oligo-saccharide in MFC is preferable between 0.1-10%.
Typical solid content for a barrier composition is between 5-60% by weight, and more preferable between 10-50% by weight, and even more preferable 20-40% by weight.

The invention claimed is:
1. A cellulosic composition comprising:
microfibrillated cellulose (MFC),
a pigment, and
mono-, di- or oligo-saccharides in an amount of 0.1-10% by weight by amount of pigment and wherein the composition has a dry content of 40-70% by weight, and wherein a portion of the microfibrillated cellulose has a length between 100 nm to 100 μm.

2. The cellulosic composition according to claim 1 wherein it comprises microfibrillated cellulose in an amount of 0.1-95% by weight by amount of pigment.

3. The cellulosic composition according to claim 1 wherein the MFC of the composition is produced by at least party enzymatic treatment of cellulosic fibers.

4. The cellulosic composition according to claim 1 wherein the mono-, di- or oligo-saccharide is a sugar.

5. The cellulosic composition according to claim 4, wherein the sugar is glucose, xylose, mannose, mannan or cellodextrin.

6. The cellulosic composition according to claim 5, where the cellodextrin is cellobiose, cellotriose, cellotetrose, cellopentose, cellohexose and/or cello-oligosachride.

7. The cellulosic composition according to claim 1 wherein the mono-, di- or oligo-saccharide are modified.

8. The cellulosic composition according to claim 1 wherein the pigment is ground or precipitated calcium carbonate, calcinated clay, talcum, kaolin, bentonite or other swelling clays, $Al_2O_3$, aluminum hydroxide, plastic pigments, silica, gypsum, titanium dioxide, organic pigments, or a mixture of any of these pigments.

9. The cellulosic composition according to claim 8, wherein the organic pigments are starch pigments or calcium stearate dispersions.

10. The cellulosic composition according to claim 1 wherein the MFC is modified.

11. The cellulosic composition according to claim 10, wherein the modified MFC includes carboxymethyl cellulose (CMC).

12. The cellulosic composition according to claim 1 wherein the composition further comprises dispersants or lubricants.

13. The cellulosic composition according to claim 12, wherein the dispersants or lubricants are selected from the group of polyacrylic acids, acrylate copolymers, sodium salts of acrylic acids, maleic acid, polymaleic acids, sodium citrate, sodium malonate, sodium succinate, sodium malate, sodium glutamate, polyphosphates, calcium stearate, PEG, triglycerides, sodium hexametaphosphate (SHMP), polyvinyl alcohol, polyvinyl aceate, PVOH/Ac, sodium n-silicate, sodium polyaluminate, sodium tetraborate, bipolar organic dispersants, ethylene glucole, methanol, methyl amine, propyl amine, aniline, polypolar dispersants, polyethylene oxides and polyethylene derivatives.

14. The cellulosic composition according to claim 1 wherein the composition further comprises sorbitol.

15. Process for the production of a cellulosic composition according to claim 1 wherein a pigment is added to a dispersion comprising MFC, mono-, di- or oligo-saccharide and water.

16. The process of claim 15, wherein the MFC is produced by at least partly enzymatic treatment of cellulosic fibers and wherein the mono-, di- or oligo-saccharide are produced during the enzymatic treatment of cellulosic fibers.

17. The process according to claim 15 wherein the pigment is added dry.

18. The process according to claim 15 wherein the dispersion comprising MFC has a consistency of 1-40% by weight before the pigment is added.

19. The process according to claim 15 wherein the MFC is produced by at least partly enzymatic treatment of cellulosic fibers.

* * * * *